(12) United States Patent
Moxon

(10) Patent No.: US 9,096,312 B2
(45) Date of Patent: Aug. 4, 2015

(54) AIRCRAFT

(71) Applicant: ROLLS-ROYCE PLC, London (GB)

(72) Inventor: Matthew Moxon, Otley (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 14/537,112

(22) Filed: Nov. 10, 2014

(65) Prior Publication Data

US 2015/0144742 A1 May 28, 2015

(30) Foreign Application Priority Data

Nov. 28, 2013 (GB) .................... 1320988.7

(51) Int. Cl.
| | | |
|---|---|---|
| *B64C 3/28* | (2006.01) | |
| *B64C 23/00* | (2006.01) | |
| *B64C 3/00* | (2006.01) | |
| *B64C 39/00* | (2006.01) | |
| *B64D 27/24* | (2006.01) | |
| *B64D 27/10* | (2006.01) | |
| *B64C 11/00* | (2006.01) | |
| *B64C 9/18* | (2006.01) | |

(52) U.S. Cl.
CPC ............... *B64C 23/005* (2013.01); *B64C 3/00* (2013.01); *B64C 3/28* (2013.01); *B64C 9/18* (2013.01); *B64C 11/00* (2013.01); *B64C 39/00* (2013.01); *B64D 27/10* (2013.01); *B64D 27/24* (2013.01); *B64C 2700/6274* (2013.01)

(58) Field of Classification Search
CPC ...... B64C 3/28; B64C 9/18; B64C 2700/6274
USPC ........................................................ 244/215
See application file for complete search history.

(56) References Cited

U.S. PATENT DOCUMENTS

| 4,605,185 A | 8/1986 | Reyes | |
|---|---|---|---|
| 2004/0118969 A1* | 6/2004 | MacCready et al. | ............ 244/5 |
| 2006/0254255 A1* | 11/2006 | Okai et al. | ................... 60/226.1 |

FOREIGN PATENT DOCUMENTS

| EP | 2 581 308 A2 | 4/2013 |
|---|---|---|
| GB | 2497136 A | 6/2013 |

OTHER PUBLICATIONS

Bradley, M. et al. "NASA N+3 Subsonic Ultra Green Aircraft Research SUGAR Final Review." Apr. 20, 2010. http://aviationweek.typepad.com/files/boeing_sugar_phase_i_final_review_v5.pdf.
Jun. 26, 2014 Search Report issued in GB Application No. 1320988.7.
Mar. 10, 2015 European Search Report issued in EP Application No. 14 19 2431.

* cited by examiner

*Primary Examiner* — Justin Benedik
(74) *Attorney, Agent, or Firm* — Oliff PLC

(57) ABSTRACT

An aircraft (40). The aircraft (40) comprises a propulsion system comprising a pair of internal combustion engines (10) each driving an electrical power generator (56), each electrical power generator (56) being electrically coupled to a plurality of electrically driven propulsors (46). The propulsors (46) are located forward of a leading edge (45) of the wings (44) such that an airstream generated by the propulsors flows over the wings (44) in use. Each internal combustion engine (10) and electrical generator (56) is mounted on a respective wing (44) outboard of a center of thrust (70) of the propulsors (46) on that wing (44).

12 Claims, 2 Drawing Sheets

// AIRCRAFT

The present invention relates to an aircraft. In particular, the invention relates to an aircraft having distributed propulsion.

BACKGROUND

Conventional aircraft comprise a tubular fuselage having wings extending therefrom for providing lift. Engines in the form of, for example, turbofans and turboprops are mounted on the aircraft for providing forward thrust. A conventional location for mounting aircraft engines is on the wing. A prior aircraft 1 is shown in FIG. 1, in which the aircraft 1 comprises a fuselage 2 and wings 3. The aircraft 1 is powered by turboprop engines 4, the engines 4 being mounted such that propellers 5 are located forward of the wing 2 and either side of the fuselage 2.

There is a continuing need for more efficient aircraft designs, in terms of structural efficiency (i.e. minimising the overall weight of the aircraft structure), aerodynamic efficiency (i.e. minimising the aerodynamic drag incurred during flight) and fuel efficiency (i.e. minimising the fuel required to perform a particular aircraft mission). One solution for increasing aircraft efficiency is to provide an aircraft driven by a distributed propulsion system.

In a distributed propulsion system, a generator such as an internal combustion engine is employed to produce electrical power or mechanical shaft power. This power is provided to a plurality of propulsors, such as electric fans distributed about the aircraft, remote from the internal combustion generator.

"Distributed Turboelectric Propulsion for Hybrid Wing Body Aircraft" by Hyun Dae Kim, Gerald V Brown and James L Felder, published by the Royal Aeronautical Society, describes a number of distributed propulsion system and aircraft concepts. This document describes concepts in which a relatively large number of electrically driven propulsors are powered by a relatively small number of internal combustion engines. Previously proposed concepts such as those described in the above document generally comprise distributed propulsors located near the rear of the aircraft fuselage, or at the trailing edge of the wings. These concepts are expected to obtain a benefit from "boundary layer ingestion" by the distributed propulsors, in which boundary layer air close to the aircraft fuselage or wing is accelerated by the aft located propulsors, thereby filling in the wake produced by the aircraft, reducing drag. However, such concepts offer only a relatively limited fuel efficiency benefit, and do not offer significant or any structural efficiency improvements over conventional designs.

It is an object of the present invention to alleviate the problems of the prior art at least to some extent.

The invention is set out in the accompanying claims.

According to a first aspect of the invention, there is provided an aircraft comprising a longitudinal centre line, a pair of wings, each wing extending from a respective side of the longitudinal centre line and having a selectively deployable high lift device, and a propulsion system, the propulsion system comprising a plurality of electrically driven propulsors and a generator arrangement comprising an internal combustion engine driving one or more electrical power generators, each electrical power generator being electrically coupled to one or more electrically driven propulsors, such that each internal combustion engine provides power for a plurality of the electrically driven propulsors, wherein the electrically driven propulsors are located forward of a leading edge of the wings and the high lift device such that an airstream generated by the propulsors flows over the wings and high lift device or devices in use.

It has been found that, by placing the propulsors forward of the wing leading edge, the slipstream provided by the propulsors passes over the wing and high lift device. Consequently, lift being proportional to the square of flow velocity, more lift is generated by the wing compared to prior designs, particularly where the high lift device or devices are deployed and the aircraft's flight speed is low. Accordingly, a smaller wing can be provided whilst still meeting a given takeoff or landing distance requirement, or the same wing area can be provided for improved takeoff and landing performance.

Because the high lift device or devices deflect the slipstream from the propulsors when in use, this concept is known as a deflected slipstream high lift system.

The, or each, generator arrangement may be mounted within the fuselage. Alternatively, the, or each, generator arrangement may be mounted on a respective wing outboard of a centre of thrust of that wing. A pair of generator arrangements may be provided. The internal combustion engine may comprise a gas turbine engine.

Since the propulsion of the aircraft is provided at least in part by the electrically driven propulsors, the internal combustion engines and their electrical generators can be located remotely from the propulsors.

By locating the generator arrangement outboard of the centre of thrust of the propulsors on the respective wing, the relatively heavy generator arrangement can provide wing root bending moment relief (also known as "inertia relief"), thereby reducing the loads on the wing structure, and allowing a lighter wing structure to be employed, thereby leading to improved structural efficiency. The inventor has also discovered that these benefits can be further improved by further inventive developments.

Each wing may have a high aspect ratio. The term "aspect ratio" will be understood to refer to the ratio of the square of the span of the wing to its area. The aspect ratio may be greater than 10, may be greater than 15, may be less than 30, and in one embodiment may be approximately 25. Due to the increased structural efficiency provided by the wing root bending moment relief as a consequence of the placement of the propulsors and generators, higher aspect ratio wings can be provided than could normally be efficiently employed. Consequently, the wings produce less induced drag compared to conventional designs, or prior proposed distributed propulsion concepts, leading to reduced fuel consumption.

Additionally, because of the increased maximum lift coefficient available from the wing due to the deflected slipstream effect, the cruising lift coefficient may be increased whilst maintaining a given ratio of cruising lift coefficient to takeoff or landing lift coefficient. An increased cruising lift coefficient is required to extract maximum benefit from a high aspect ratio wing.

Because the ratio between the cruising speed and the takeoff or landing speed is equal to the square root of the ratio between the takeoff or landing lift coefficient and the cruising lift coefficient, multiplied by the ratio between the air density at the runway and that at the cruising altitude, this means that conventional aeroplanes not employing the deflected slipstream high lift system enabled by the distributed propulsion system of the present invention, would be unable to exploit the aerodynamic benefits of high aspect ratio wings without either cruising more slowly (which reduces aircraft productivity), taking off and landing at higher speeds (which requires longer runways, increases brake energy requirements etc.), or cruising at higher altitudes (which complicates the design of the pressure cabin, may lead regulators to impose limits upon window size, increases engine size requirements, and is therefore generally impractical for public transport aeroplanes).

Therefore, an important feature of the present invention is that it not only renders the use of high aspect ratio wings less expensive in terms of structural weight, but also makes them more attractive, since it increases the aerodynamic benefits which may reasonably be extracted from them.

The internal combustion engines may be configured to provide thrust. The total thrust produced by the internal combustion engines may be less than the total thrust produced by the electrically driven propulsory.

The aircraft may comprise a vertical tailplane located a distance from a centre of gravity of the aircraft parallel to the centre line of the aircraft. Where the aircraft comprises a single thrust producing internal combustion engine located on each wing, a centre of thrust of each internal combustion engine may be located spaced from the centre of gravity of the aircraft normal to the centre line of the aircraft a distance more than one quarter of the distance of the tailplane from the centre of gravity of the aircraft. Where the aircraft comprises a pair of thrust producing internal combustion engines on each wing, a centre of thrust of the pair of internal combustion engines may be located spaced from the centre of gravity of the aircraft normal to the centre line of the aircraft a distance more than one half of the distance of the tailplane from the centre of gravity of the aircraft. The internal combustion engines may be located substantially at the wing tip.

Because the internal combustion engines produce only a proportion of the thrust, with the remainder being provided by the electrically driven propulsors, and so produce less thrust than conventional designs, the engines can be located further outboard than conventional designs. This is because aircraft designs having wing mounted engines must be controllable with at least one engine being inoperative. In conventional configurations, the asymmetric thrust provided in such situations by each thrust producing engine results in a yawing moment, which must be cancelled by the vertical stabilizer (which is generally itself sized by this requirement). In any event, some of the thrust is cancelled by trim drag when only one engine is operational. Consequently, in conventional designs there is a design trade-off between engine placement (and so wing root bending moment relief) and tail size (and so weight and drag caused by the tail). In many conventional designs, and particularly in the case of twin engine turboprops, the negative effect of increased tail size outweighs any benefits of wing bending moment relief caused by placing the engines out towards the tips of the wings, and so the engines are provided as far inboard on the wings as possible. However, in the present invention, since the electrically driven propulsors provide the majority of the thrust, the internal combustion engines can be located further outboard without causing excessive yaw in the event of failure of one engine. Furthermore, the size of the vertical stabilizer may be reduced, yielding beneficial reductions to both the weight and drag of the aircraft.

The electrically driven propulsors may be electrically coupled to two or more electrical power generators. Consequently, if one of the generators fails, all of the propulsors can continue to operate, albeit at reduced power. As a result, no yaw is produced by the electrically driven propulsors on failure of one of the internal combustion engines. Consequently, all of the thrust produced by the propulsors can be utilised while keeping control the aircraft. This can in turn provide improved operability of the aircraft.

Each electrically driven propulsor may comprise a propeller. Each electrically driven propulsor may be electrically coupled to the respective generator by a superconductor.

Two or more electrically driven propulsors may be provided on each wing.

The propulsors may have a combined maximum thrust, and may extend over a proportion of the span of the wing, such that the coefficient of lift of the wing, referenced to the freestream flow velocity, when the propulsors are generating their maximum combined thrust and the high lift device is deployed, is substantially double, or more than double, the coefficient of lift of the wing when the propulsors are generating their minimum combined thrust and the high lift device is deployed. Due to the airflow over the wings, the coefficient of lift of the wings is increased when the propulsors are at high power, compared to where they are at low power. Since both maximum thrust and maximum lift for a design mission are required at takeoff, the wing can be reduced in size due to the increased lift provided at high power settings. The lift coefficient is also increased when the propulsors are at maximum thrust compared to minimum thrust when the high lift device is not deployed—however, the increase in this case is generally smaller. In view of the large number of propulsors, the loss of a single propulsor will not significantly impact the coefficient of lift of the wing, thereby providing safety. It has been found that particularly pronounced benefits are provided where the "power on" coefficient of lift is double that of the "power off" coefficient of lift, since the wing can be made substantially smaller for the same amount of lift at takeoff, or the increased lift can be used to increase takeoff performance.

The deployable high lift device may comprise a flap located at a trailing edge of the wing. The flap may comprise a split flap, a plain flap, a "Fowler" flap, a slotted flap, or other combinations of flaps and slots, as are known in the art. Alternatively or in addition, the high lift device may comprise a slat or a plurality of slats at the leading edge of the wing. A plurality of deployable high lift devices may be provided, which may be individually deployable.

Embodiments of the invention will now be described by way of example, with reference to the accompanying figures in which.

Figure 1:
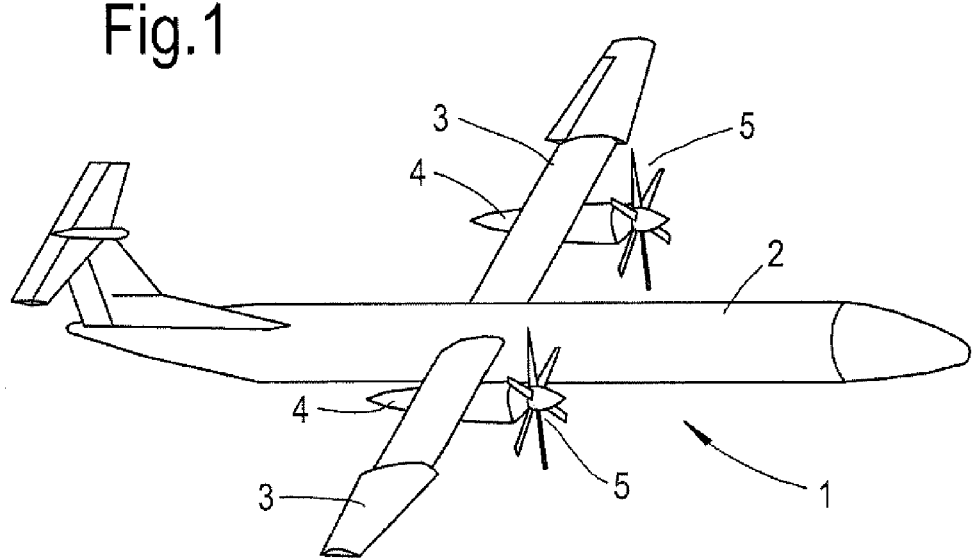
FIG. 1 is a perspective wire frame view of a prior aircraft.
Figure 2:
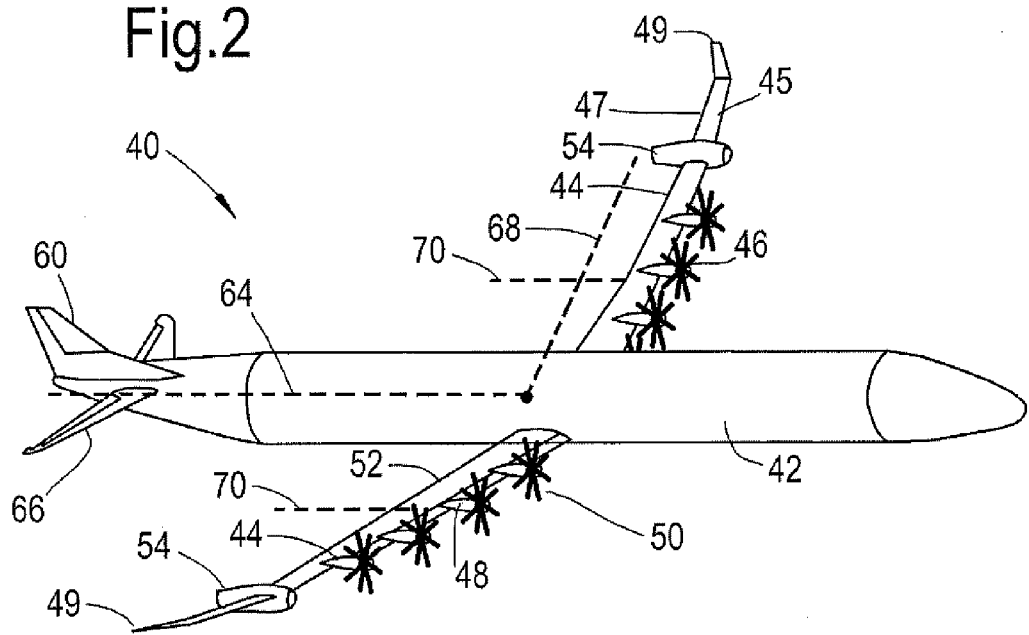
FIG. 2 is a perspective wire frame view of a first aircraft in accordance with the invention.

Referring to FIG. 2, a first aircraft 40 is shown. The aircraft comprises a fuselage 42, a pair of wings 44 extending therefrom generally normal to the fuselage 42, and an empennage located at an aft end of the fuselage 42. The empennage comprises vertical and horizontal tailplanes 60, 66.

A wingspan is defined by the distance between wing tips 49. Each wing 44 comprises a leading edge 45 and a trailing edge 47, which together define a chord extending therebetween. The ratio between the wingspan and chord length defines an aspect ratio. As can be seen from FIG. 2, the chord length varies along the wing span, from a relatively large chord at the wing root adjacent the fuselage 42, to a relatively small length at the wing tips 49. In cases such as this where the chord varies along the span, the aspect ratio AR can be defined as the square of the wingspan b divided by the area S of the wing planform:

$$AR = \frac{b^2}{S}$$

In the example shown in FIG. 2, the aspect ratio is approximately 25, though higher aspect ratios such as aspect ratios up to 30 or more may be achieved. In other cases, lower aspect ratios may be desirable, such as where the aircraft comprises a short takeoff and landing aircraft (STOL). Each wing 44 preferably further comprises a deployable high lift device in the form of flaps 52 located at the trailing edge 47 of each wing 44. Optionally, the deployable high lift device may include one or more slats (not shown) located at the leading edge 45 of the wing. The flaps 52 are selectable between a stowed position (as shown in FIG. 2) and a deployed position, in which the flaps 52 increase the lift coefficient of the wing 44 compared to when the flaps 52 are in the stowed position. The deployable high lift devices may be deployable to intermediate positions between the deployed and stowed positions.

A plurality of propulsors 46 is provided on each wing 44, which provide thrust to drive the aircraft forward. The plurality of propulsors 46 on each wing together define a centre of thrust 70, i.e. a notional line extending rearwardly from the centre of the airflow provided by the propulsors 46 on that wing 44. In the described embodiment, four propulsors are provided, though more or fewer propulsors may in some cases be provided. The relatively large number of propulsors 46 enables a relatively large propulsor disc area to be employed. Consequently, the propulsors are highly efficient and relatively quiet, without requiring excessive ground clearance, which thereby reduces the length of the undercarriage.

Each propulsor 46 comprises an electric motor (not shown) housed within a nacelle 48, and a propeller 50 driven by the motor, though other forms of propulsors such as electrically driven ducted fans could be employed. Each propeller 50 is located forward of the leading edge 45 of the wing 44, and is mounted to the wing 44 by the nacelle 48. In use, the propellers 50 rotate to provide airflow, and therefore thrust. As the propellers 50 are located forward of the leading edge 45, the airflow travels over the portion of the wing 44 located behind the respective propellers 50, and in particular over the flaps 52. This airflow increases the effective airflow over the wing 44, thereby increasing the coefficient of lift ($C_L$) when the propellers 50 are turning, and particularly where the flaps 52 are extended. The propellers 50 are relatively closely spaced, such that the propellers 50 provide airflow over a large proportion of the wing 44, and particularly, the portion of the wing on which the flaps 52 are located.

In the described embodiment, the maximum coefficient of lift of each wing 44 when the flaps 52 are deployed, and the propulsors 46 are at maximum power ($C_{Lmax(power\ on)}$) is approximately twice the maximum coefficient of lift of each wing 44 when the propulsors 46 are at minimum power ($C_{Lmax(power\ off)}$), i.e. when the propulsors 46 are turned off. Consequently, the propulsors 46 substantially increase the amount of lift generated by the wings 44, thereby reducing the wing area required for a given amount of lift, or increasing the amount of lift for a given wing area.

Each wing further 44 comprises a generator arrangement 54 comprising an internal combustion engine in the form of a internal combustion engine 10 and an electrical power generator 56. In the described embodiment, a single generator arrangement is provided on each wing 44, though further generator arrangements could be provided. The internal combustion engine 10 drives the electrical power generator 56 to provide electrical power. An electrical energy storage device such as a capacitor, chemical battery or hydrogen fuel cell (not shown) might also be included, which could be charged by the internal combustion engine, and provide power to the propulsors for a short period on engine failure or to improve performance for short duration flight segments such as e.g. takeoff or climb.

Figure 3:
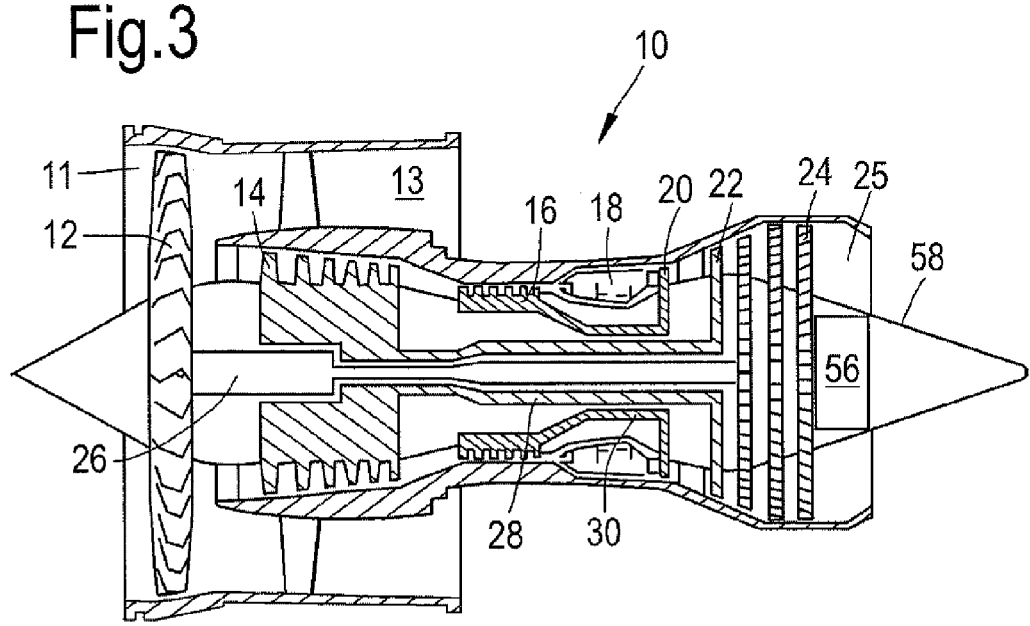
FIG. 3 is a cross sectional view of an internal combustion engine.

Referring to FIG. 3, each internal combustion engine 10 comprises an air intake 12 that generates an airflow A. The internal combustion engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. Optionally, a nacelle 30 may surround the internal combustion engine 10, which defines a bypass duct 32 housing an optional fan 14. The fan is driven by the low pressure turbine 26. Each of the fan 14, intermediate pressure compressor 16, high pressure compressor 18, high pressure turbine 22, intermediate pressure turbine 24 and low pressure turbine 26 comprises one or more rotor stages. The lower pressure turbine 24 also drives the electrical power generator 56, which is located to the rear of the low pressure turbine 24 within a tailcone 58, though other placements of and arrangements for driving the generator 56 could be envisaged.

The internal combustion engine provides thrust from flow A and optional flow B. However, generally, the majority of the power generated by the engine 10 is absorbed by the electrical power generator 56, and so the internal combustion engine 10 produces less thrust than the propulsors 46.

Referring again to the embodiment in FIG. 2, each generator arrangement 54 is located on a respective wing 44, relatively far outboard near the respective wing tips 49. In other embodiments, the generator arrangement may be located within the fuselage, or mounted internally or externally to other parts of the aircraft. The placement of the generator arrangement 54 relatively far outboard ensures that a large amount of wing bending moment relief is provided by the weight of the generator arrangements 54, thereby increasing structural efficiency. In general, each generator arrangement 54 is located outboard of a centre of lift of the propulsors 46 on the respective wing 44. This is possible, since the internal combustion engines 10 produce relatively little thrust, and so relatively little asymmetric thrust is provided in a failure condition where only one engine is operated.

Figure 4:
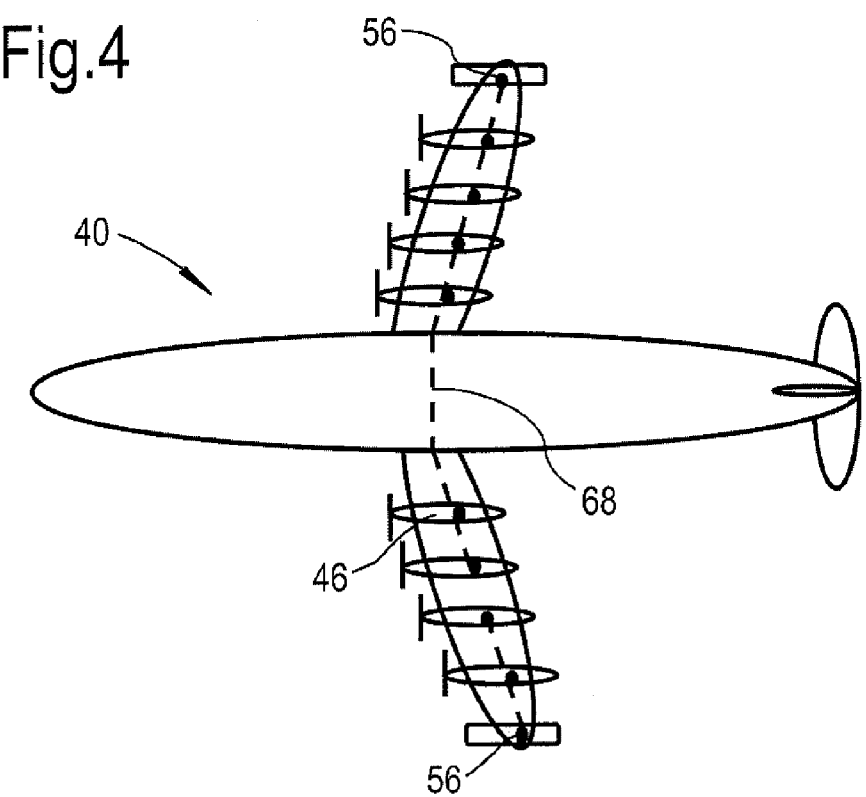
FIG. 4 is a plan view of the aircraft of FIG. 2, showing the electrical connections between various components.

FIG. 4 shows the electrical connections between various components. Each electrical generator 56 is connected to a plurality of propulsors 46 on the respective wing by a main electrical bus 68. The main electrical bus may comprise a conventional conducting cable, or in some cases may comprise a superconductor. Generally, the bus 68 connects to the propulsors 46 in parallel. However, unlike previous concepts, it has been found that it is not generally necessary to employ a superconductor in order to provide a benefit from the current invention.

The main electrical bus 68 also extends across the fuselage 42 to connect each electrical generator 56 to the propulsors 46 on the opposite wing 44. Consequently, all of the propulsors continue to receive electrical power on failure of one of the internal combustion engines 10 or electrical generators 56. As a result, no adverse yaw is produced on failure of the engines 10 or generators 56, reducing trim drag, and the size of the vertical stabilizer 60. On the other hand, due to the relatively large number of propulsors 46, failure of a single propulsor will result in a relatively small loss of thrust and thrust asymmetry, again reducing trim drag and the size of the stabilizer 60. The horizontal stabilizer 66 can also be located directly behind the trailing edge 45 of the wings 44 in a conventional fuselage mounted configuration, compared to the "T-tail" configured employed in the prior art. This is because the relative large number of propulsors 46 move a larger amount of air more slowly compared to prior designs, in which only a pair of propellers is provided. Furthermore, the prop wash is deflected downwards, so a fuselage mounted horizontal stabilizer 66 is not generally located in the prop-wash. Consequently, the aircraft 40 is less likely to encounter problems associated with T-tails, such as deep stall, and may have a lower structural weight. The empennage may also comprise further electrically driven propulsors, such that a deflected slipstream can be provided at the tail, thereby enabling sufficient control authority from a smaller empennage.

The described aircraft 40 is a "regional aircraft" having a typical cruise speed of between 460 and 660 kilometers per hour. For this level of performance, it is expected that each motor will have to be rated for approximately 1 MW, and each electrical generator 56 will have to be rated for 4 MW. Consequently, each internal combustion engine 10 will have to be rated to generate sufficient mechanical power to drive the generator 56 to produce 4 MW electrical power. However, the invention is also applicable to different aircraft types.

It will be understood that the invention has been described in relation to its preferred embodiments and may be modified in many different ways without departing from the scope of the invention as defined by the accompanying claims. For example, different numbers of generator arrangements and propulsors could be provided. The propulsors could be of different types, such as ducted fans. The invention could be applied to larger or smaller aircraft, travelling at higher or lower speeds.

The invention claimed is:

1. An aircraft comprising a longitudinal centre line, a pair of wings, each wing extending from a respective side of the longitudinal centre line and having a selectively deployable high lift device, and a propulsion system, the propulsion system comprising a plurality of electrically driven propulsors and a generator arrangement comprising a gas turbine engine driving one or more electrical power generators, each electrical power generator being electrically coupled to one or more electrically driven propulsors, such that each gas turbine engine provides power for a plurality of the electrically driven propulsors, wherein the electrically driven propulsors are located forward of a leading edge of the wings and the high lift device such that an airstream generated by the propulsors flows over the wings and high lift device in use.

2. An aircraft according to claim 1, wherein the or each generator arrangement is mounted on a respective wing outboard of a centre of thrust of the propulsors on that wing.

3. An aircraft according to claim 1, wherein each wing has an aspect ratio greater than 10.

4. An aircraft according to claim 1, wherein the gas turbine engines are configured to provide thrust.

5. An aircraft according to claim 4, wherein the total thrust produced by the gas turbine engines is less than the total thrust produced by the electrically driven propulsors.

6. An aircraft according to claim 1, wherein the aircraft comprises a pair of thrust producing gas turbine engines on each wing, and a centre of thrust of the pair of gas turbine engines is located spaced from the centre of gravity of the aircraft normal to the centre line of the aircraft a distance more than one half of the distance of the tailplane from the centre of gravity of the aircraft.

7. An aircraft according to claim 1, wherein the gas turbine engines are is located substantially at the wing tip.

8. An aircraft according to claim 1, wherein the electrically driven propulsors are electrically coupled to two or more electrical power generators.

9. An aircraft according to claim 1, wherein each electrically driven propulsor comprises a propeller.

10. An aircraft according to claim 1, wherein two or more electrically driven propulsors are provided on each wing.

11. An aircraft according to claim 1, wherein the propulsors have a combined maximum thrust, and extend over a proportion of the span of the wing, such that the coefficient of lift of the wing when the propulsors are generating their maximum combined thrust is substantially double the coefficient of lift of the wing when the propulsors are generating their minimum combined thrust.

12. An aircraft according to claim 1, wherein the deployable high lift device comprises at least one of a flap located at a trailing edge of a wing, and a slat located at a leading edge of a wing.

* * * * *